US 6,618,821 B1

(12) United States Patent
Duncan et al.

(10) Patent No.: US 6,618,821 B1
(45) Date of Patent: Sep. 9, 2003

(54) FAULT TOLERANT NETWORK SERVER HAVING MULTIPLE SLIDEABLY-MOUNTED PROCESSING ELEMENTS SHARING A REDUNDANT ARRAY OF INDEPENDENT DISKS THROUGH SCSI ISOLATORS

(75) Inventors: James R. Duncan, Houston, TX (US); Edgar Hance, Houston, TX (US); David A. McAfee, Spring, TX (US); Gerald J. Merits, Houston, TX (US); Mike L. Pelonero, Houston, TX (US); Patrick A. Raymond, Sugar Land, TX (US); Everett R. Salinas, Pasadena, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/481,954

(22) Filed: Jan. 12, 2000

(51) Int. Cl.[7] .................................................. G06F 11/00
(52) U.S. Cl. ............................................. 714/14; 714/7
(58) Field of Search ................................. 214/6, 10, 11, 214/14

(56) References Cited

U.S. PATENT DOCUMENTS

| | | | | |
|---|---|---|---|---|
| 4,014,598 A | * | 3/1977 | Stalley et al. | 312/236 |
| 4,331,306 A | * | 5/1982 | Epina et al. | 242/331.1 |
| 5,774,643 A | * | 6/1998 | Lubbers et al. | 714/20 |
| 6,327,675 B1 | * | 12/2001 | Burdett et al. | 714/11 |
| 6,351,829 B1 | * | 2/2002 | Dupont et al. | 714/48 |

OTHER PUBLICATIONS

Black Box Corp., Black Box Network Services Catalog.*
Brian Livingston, Utilities can help you monitor and manage Windows NT, Win98, Jan. 18, 1999, www.users.voicenet.com/~orcutt/nt_tips/nt_1.htm.*
Black Box Catalog, Black Box Corp., VR1–S.*
1776soft.com, the solution—"server failover" software, Jan. 13, 1998, web.archive.org/web/19980113192910/http://1776soft.com/ffblowso.htm.*
Donald E. Koehler, Rack 'em up, Site–mag.com, Jul. 1, 2001, site–mag.com/ar/telecom–rack_em_2/.*
Rawn Shah, Building a reliable NT server, Part 1, www.users.voicenet.com/~orcutt/nt_tips/nt_tip_2.htm.*
SYM53C140 Ultra2 SCSI Bus Expander, 1999, LSI Logic Corporation.
Application Scaling with Compaq NonStop® Clusters for SCO UnixWare Software, 1999, Compaq Computer Corporation.
SYM53C140 Ultra2 SCSI Bus Expander.

* cited by examiner

Primary Examiner—Nadeem Iqbal
Assistant Examiner—Timothy M. Bonura

(57) ABSTRACT

A fault tolerant network server is described. This server has a pair of processing units, each processing unit has at least one CPU, system memory, an interface for a RAID system, at least one disk drive, a network interface, a cluster network interface, a power supply, and a case. The cases of both processing units are slideably mounted in a rack-mountable server case. The server also has a RAID system mounted in the server case and powered by two, redundant, power supplies and coupled to the processing units through isolators for blocking transactions when a processing unit has insufficient power or is being serviced.

20 Claims, 4 Drawing Sheets

FAULT TOLERANT NETWORK SERVER HAVING MULTIPLE SLIDEABLY-MOUNTED PROCESSING ELEMENTS SHARING A REDUNDANT ARRAY OF INDEPENDENT DISKS THROUGH SCSI ISOLATORS

The present invention relates to the field of fault tolerant computing systems, and more particularly to fault tolerant network servers having multiple processing elements that share common RAID systems for storing database data.

BACKGROUND OF THE INVENTION

Like everything else made by Man, computer systems are known to cease functioning properly at times. Failed computing systems are known to cause serious problems for businesses that rely on them, including such transaction processing systems as bank database servers and airline reservation systems. There is therefore a strong market for failure tolerant computing systems and other devices, like UPS (Uninterruptable Power System) devices and backup generators, intended to minimize downtime for these businesses.

RAID (Redundant Array of Independent Disks) systems are known in the art of failure tolerant computing. In applications requiring fault tolerant computing, these systems frequently operate with several disk drives in RAID-1 (data mirroring), or RAID-5 (parity disk) mode. In either of these modes, it is possible for a database to be reconstructed after, or even to continue servicing transactions when, any one of the several disk drives in a RAID set has ceased to operate correctly.

It is known that, through use of hot-plugable disk drives in a shelf configured to receive them, it is possible to replace a failed drive of a SCSI-based RAID system with a spare drive without need to shut down the system. Hot-pluggable drives are usually contained in drive cases having a connector configured such that the power and ground connections to a drive being inserted are made before the drive is connected to the data lines of a SCSI bus. Once the failed drive has been replaced, reconstruction of data on the failed drive can also proceed while the RAID system continues at least some level of data transfers to processor units. Once data reconstruction is complete, the RAID system becomes once again fault tolerant.

A shelf of disk drives, or a RAID controller, of a RAID system may be powered by multiple power supplies receiving power from multiple sources. This is known to allow continued operation of the shelf of drives or RAID controller when any one power supply or power source fails or suffers a transient. Such systems are available from many sources.

RAID controllers are special-purpose computing hardware that map disk-access requests into operations on the array of disks. RAID controllers typically also generate the redundant data for RAID-1 and RAID-5 disks, and regenerate disk data as necessary when a drive is replaced. While these functions can be performed in software on a host computer, offloading these functions into a RAID controller is often advantageous for system performance because of the resultant parallelism. COMPAQ Storageworks™ (a trademark or registered trademark of COMPAQ in the United States and other countries) sells RAID controller systems wherein one or two RAID controllers receive power from a communal DC power bus, the power bus being driven from multiple power supplies receiving power from multiple sources. These RAID controllers are available with SCSI interfaces to the disk drive shelves and host computer system.

RAID controllers, as with the COMPAQ Storageworks™ systems, contain memory for caching disk operations. This memory may be configured in either a write-through or a write-back configuration.

The SCSI bus has several three-state data lines and several open-collector (or open-drain) control and data lines. The SCSI specification calls for the open-collector control lines to be terminated with pullups at each end of the bus. It is known that presence on a SCSI bus of typical, but unpowered, interfaces often draws at least some of these lines out of specification, especially if the unpowered interface is located at the end of the bus. Presence on a SCSI bus of such unpowered interfaces can therefore corrupt communications between operating interfaces.

It is known that system reliability may be enhanced by operating multiple processors in lockstep, with error detection circuitry used to detect any failed processor such that one or more remaining processors of the multiple processors continue execution. Multiple processors executing in lockstep are utilized in COMPAQ TANDEM fault-tolerant machines.

A Hot-Spare with failover technique may also provide a degree of fault tolerance. In this method, two or more processors are provided. Upon detection of an error or failure of one processor, a second processor, a hot or running spare, takes over the functions of the failed processor. The processor that serves as a hot-spare may also execute additional tasks, in which case a performance degradation may be observed when a processor fails.

Hot-spare with failover may also occur with processors sharing a database, as with processors operated in a "cluster" configuration. Clustered machines may have operating system software that redistributes tasks among remaining machines when a machine fails.

Most currently available RAID systems are sold separately from the processors they are used with. They therefore must be connected together in the field, where mistakes of installation can be made. Mistakes can include connection of both power connections of computing units to a first power source, with connection of both power connections of a RAID system to a second power source, such that if either power source fails, the system ceases operation. Further, field installation is often conducted by better educated, and thus more expensive, employees than is factory assembly. Field labor also has much higher travel and hotel expenses than do factory hands. Installation accuracy can be improved and expense reduced by reducing the number of connections that must be made during field installation.

SUMMARY OF THE INVENTION

A pair of computing elements are factory assembled into a network server, being slideably mounted on ball-bearing rails in a rack-mountable server cabinet. Also in the network server cabinet is a RAID disk-array subsystem containing a pair of RAID controllers, a pair of redundant power supplies, and a shelf holding six drives normally configured in RAID-5 mode. These drives may also be configured as a combination of a bunch of disks, or RAID-0, RAID-1, RAID-4 and RAID-5 sets. The computing elements each contain most of the constituent components of a dual-processor computer, and are electrically connected to the RAID controllers through SCSI isolators, whereby a failed computing element may be disconnected from the RAID controllers while the computing element is repaired or replaced.

The computing elements communicate with the RAID controllers through SCSI isolators. These isolators prevent a failed computing element—especially a computing element with a failed power supply—from corrupting communications between an operating computing element and the RAID controllers.

The computing elements also communicate with each other over a cluster interconnect and with various other servers and workstations of a network via a network interface.

DETAILED DESCRIPTION OF THE PREFERRED EMBODIMENT

Figure 1:
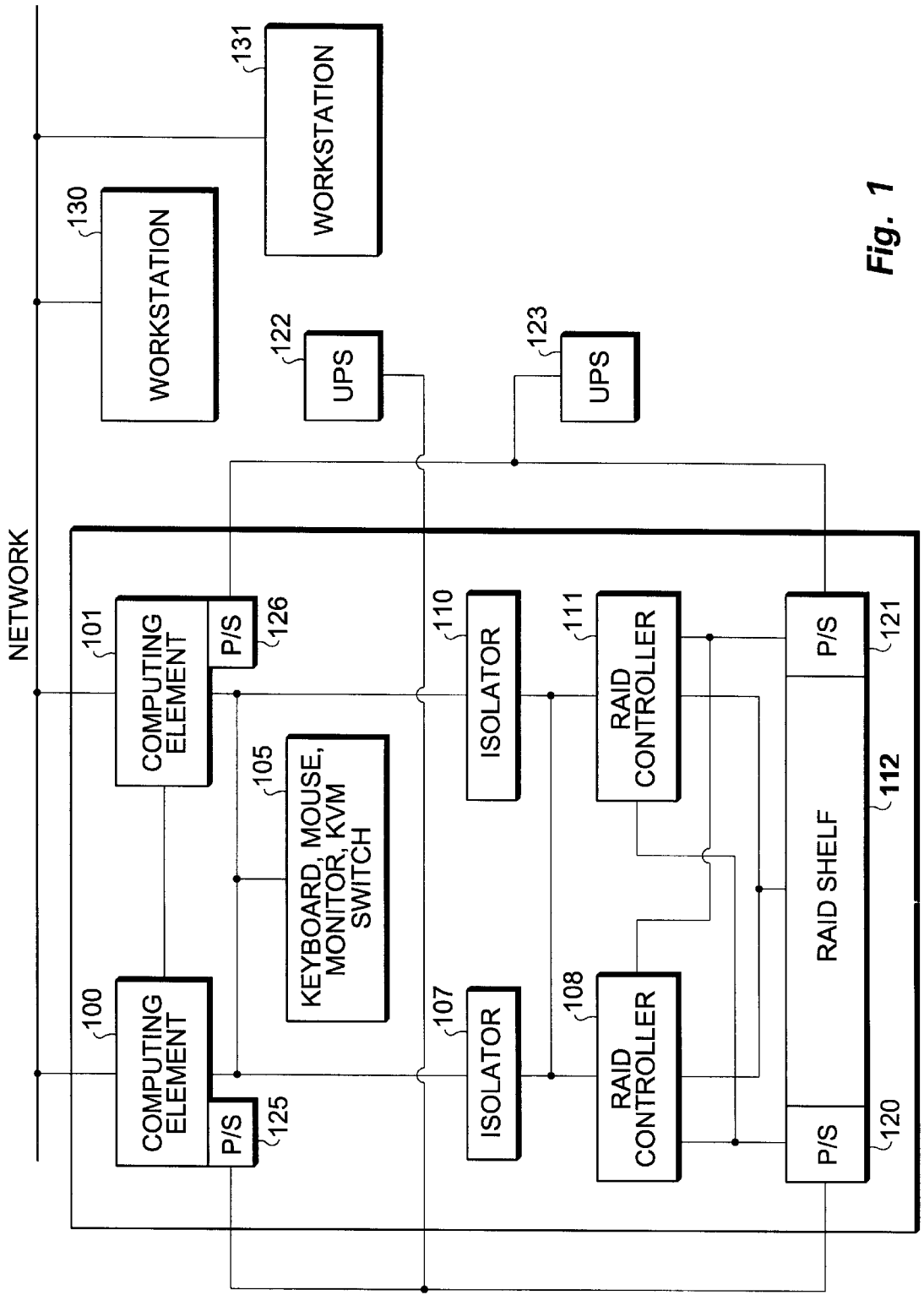
FIG. 1 is a block diagram of a fault tolerant network server of the present invention, showing its connection to a computer network.
Figure 2:
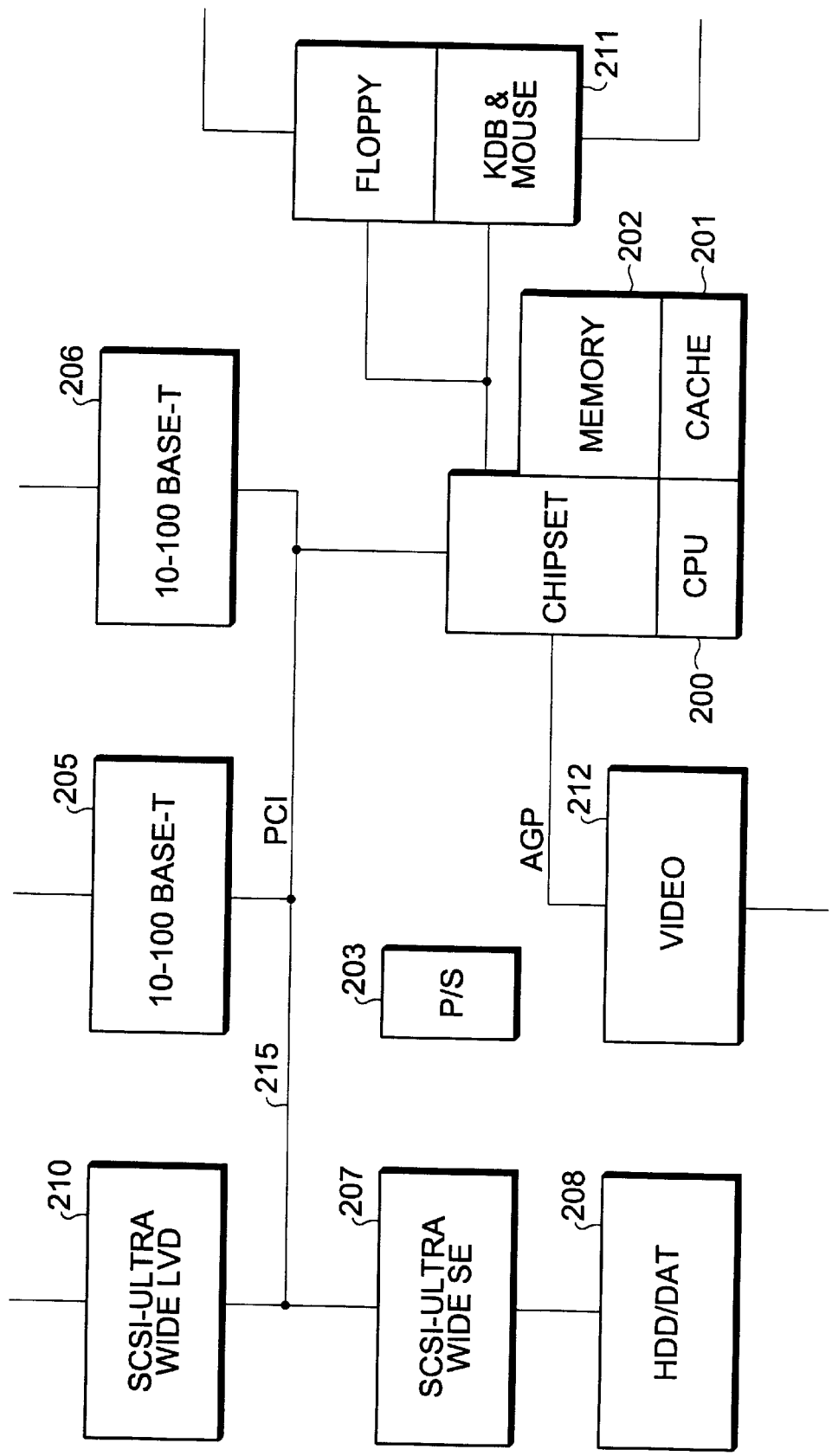
FIG. 2, a block diagram of a Computing Unit of the network server of the present invention.

A fault tolerant network server according to the present invention has a pair of similar computing units, 100 and 101 (FIG. 1). Each computing unit is equipped with at least one, and preferably two, processors 200 (FIG. 2) with local cache memory 201, main memory RAM 202, a power supply 203, a boot or BIOS ROM (not shown), a network interface 205, a second network interface for cluster communications 206, a disk interface 207, at least one and optionally several local disk drives 208, and a low-voltage differential Ultra-2-Wide SCSI interface 210. In the preferred embodiment, disk interface 207 is of the Ultra-Wide single-ended SCSI type. In the preferred embodiment, each of the two processors 200 is an Intel Pentium-III operating at five hundred fifty MHz with a one hundred MHz local, or front-side, bus, and the main memory RAM 202 of each computing unit includes one hundred twenty eight megabytes of PC-100 memory in an error-correcting (ECC) configuration.

Each computing unit also has a keyboard-mouse interface 211 and a video display interface 212. As is normal in computing units, the network interface 205, cluster interface 206, disk interface 207, SCSI interface 210, BIOS ROM, keyboard-mouse interface 211, video interface 212, and RAM 202 are disposed so as to be addressable by the at least one processor 200. A local PCI bus 215 is used for connecting at least some of these elements to the processor. Each computing element of the preferred embodiment also has a CD drive and a floppy disk drive, as are common in the art, for software installation, and may also be equipped with a tape drive.

Mechanically, each computing unit is disposed within a computing unit cabinet. The computing unit cabinet is fitted with ball-bearing slide rails so that it may be readily slid into the rack-mountable server cabinet.

An alternative embodiment (not illustrated) utilizes a pedestal-mount server cabinet in place of the rack-mountable server cabinet described.

The keyboard-mouse, and video interfaces of the first 100 (FIG. 1) and second 101 computing units are connected to a keyboard/video/mouse switch 105. This switch enables connection of a single keyboard, mouse, and monitor (not shown) to either computing unit as desired by a system operator (not shown). The SCSI interface 210, (FIG. 2) of the first computing unit 100 (FIG. 1) connects through a first SCSI isolator 107 to a first RAID controller 108, while the SCSI interface of the second computing unit connects through a second SCSI isolator 110 to a second RAID controller 111.

The two RAID controllers (108 and 110) are connected to a RAID system SCSI bus and disk shelf 112, and several SCSI hard disk drives as are known in the art are connected to the RAID system SCSI bus in the disk shelf 112. In the preferred embodiment, six SCSI hard disk drives are connected to the RAID system SCSI bus in the shelf 112.

The RAID system disk shelf 112 has two power supplies, 120 and 121. These power supplies also power the RAID controllers 108 and 111. The first RAID system power supply 120 is powered by the same power supply cord as is the power supply 125 (203 of FIG. 2) of the first computing element 100 (FIG. 1), this cord is preferably connected to a first external uninterruptable power supply (UPS) 122; and the second RAID system power supply 121 is powered by the same power supply cord as is the power supply 126 of the second computing element 101, this cord is preferably connected to a second external UPS 123. The UPS systems are connected into a port of their attached computing element such that operation of the computing element may be interrupted and data saved prior to exhaustion of the storage batteries of the UPS systems; it is also desirable that at least one of the UPS systems 123 and 122 be supplied from a backup generator (not shown) as well as from commercial power.

The cluster network interface 206, (FIG. 2), which are of the 10/100 Base-T automatic speed selecting type in the preferred embodiment, of the first computing element 100 (FIG. 1) is connected to the cluster network interface of the second computing element 101. This cluster network interconnect may be used to transmit "heartbeat" information between the computing elements, such that one computing element may know when it should assume the critical tasks normally assigned to the other computing element. The network interfaces 205 (FIG. 2), also of the 10/100 Base-T automatic speed selection type in the preferred embodiment, of both the first 100 (FIG. 1) and second 101 computing elements are connected to the communications elements of a computer network that is also attached to several workstations 130 and 131.

Figure 3:
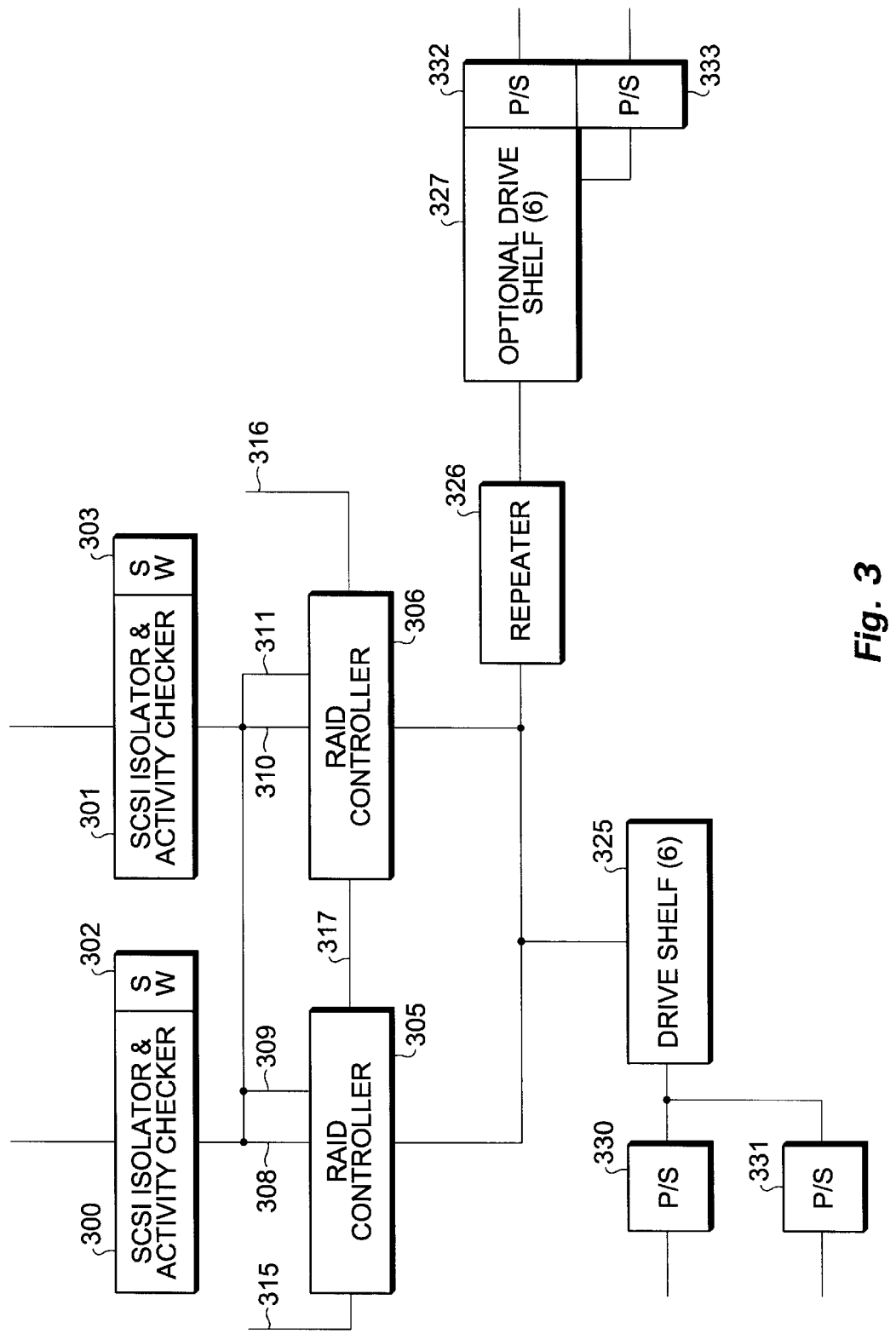
FIG. 3, a block diagram of the RAID subsystem of the fault tolerant network server of the present invention.
Figure 5:
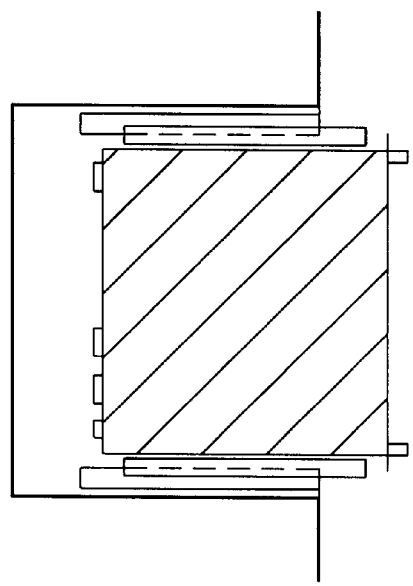
FIG. 5, a top sectional view take at A—A of FIG. 4, showing the ball-bearing mounting rails for slideably mounting the computing elements in the rack-mountable server case.
Figure 4:
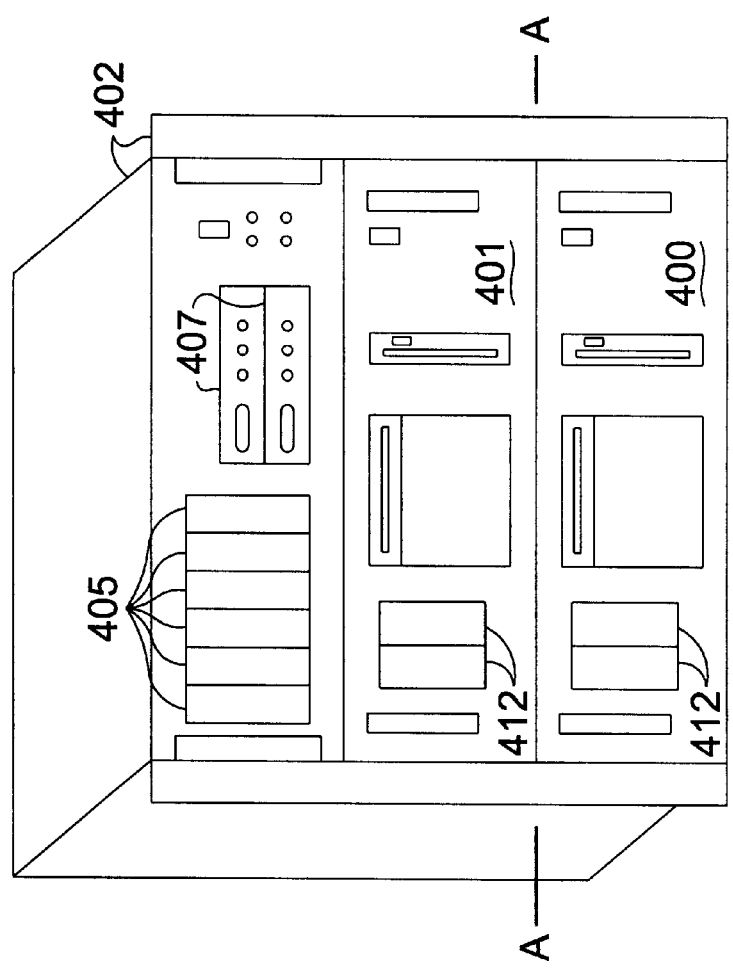
FIG. 4, a left oblique view of the server of the present invention, showing the computing elements, hot-pluggable drives, and RAID controllers, as mounted in a rack-mountable server case.

Each SCSI Isolator (107 and 110, corresponding to 300 and 301 of FIG. 3) incorporates a SCSI activity checker that illuminates an indicator light (not shown) when the computing element (100 and 101) attached is actively communicating with the RAID controllers. Each SCSI isolator also has a disable switch (302 and 303, FIG. 3) that causes the isolator to disconnect the attached computing element (100 and 101) from the RAID controllers (108 and 111, corresponding to 305 and 306 of FIG. 3) when the disable switch is engaged. Each SCSI isolator (300 and 301) also monitors a ground wire of the SCSI bus to determine if a computing element is connected. Each SCSI isolator and the SCSI interface 210 to which it connects in the attached computing element is designed such that they will not draw excessive current when a computing element is not powered. Each SCSI isolator and the SCSI interface 210 to which it connects are also designed such that a computing element that lacks power will not transmit signals through the isolator, thereby allowing a remaining computing element to communicate with the RAID controllers.

When a computing element, for example computing element 100 fails, the SCSI activity checker of the associated SCSI Isolator 107 stops indicating activity on the low-voltage differential SCSI connection to the failed computing element 100. A repair technician may then set the KVM switch 105 to the failed computing element 100 and diagnose the problem. If the problem is with software, the technician may reconfigure and restart the computing element 100. If the failure is in hardware, the technician may operate the disable switch 302 of the SCSI isolator (107 & 300) to a disable setting and perform repairs on the computing element 100, up to and including sliding the failed computing element 100 out of the server and replacing it. The SCSI Isolator (107 & 300) prevents corruption of communications between the remaining functional computing element 101 and the RAID controllers (108 and 111, corresponding to 305 and 306). Once the computing element 100 has been repaired or replaced, the technician may operate the disable switch 302 back to an active setting such that the computing element 100 may communicate with the RAID. Each entire computing element may therefore be regarded as a hot-pluggable unit.

In the preferred embodiment, disable switch 302 is a combination of a momentary-contact switch with a toggle flip-flop, such that pressing the switch flips it from the enable setting to the disable, and vice-versa. A light emitting diode indicates the current setting of the switch.

The RAID controllers 305 and 306 of the preferred embodiment each have effectively two SCSI ports (308 & 309 for controller 305; and 310 & 311 for controller 306). These are tied electrically together, but occupy separate SCSI addresses on each controller. This permits operation of the RAID controllers in a hot-spare configuration or a controller-per-computing-element with failover configuration.

Each RAID controller (305 and 306) also has a connection (315 and 316) for an optional external terminal (not shown) that may be used to configure the RAID system, and a heartbeat interconnection 317 between the RAID controllers. This heartbeat interconnection 317 is used by the RAID controllers to determine when one of the RAID controllers has failed, such that the remaining RAID controller can assume the duties of the failed controller.

The RAID controllers are hot pluggable, and each has a SCSI port for drives. These are tied together to a SCSI bus 324, and to a drive shelf (112 of FIG. 1 corresponding to 325 of FIG. 3) that may have up to six SCSI drives attached in a hot-pluggable arrangement, where during drive insertion the power and ground connections of each drive are so arranged that they make contact with the shelf before the data and control lines of the SCSI bus make contact. In the preferred embodiment, six eighteen-gigabyte SCSI drives are present in the shelf, with these drives configured as a single RAID-5 redundant set holding up to approximately ninety gigabytes of data.

The SCSI bus 324 is also connected through a SCSI repeater 326 to a connector (not shown). An optional additional drive shelf 327 containing up to an additional eight SCSI-Wide drives may be connected to this connector, with eighteen gigabyte drives this shelf can hold another one hundred twenty six gigabytes of data when configured in RAID-5 mode.

The RAID subsystem has two power supplies, (120 and 121, corresponding to 330 and 331 of FIG. 3), that power the RAID controllers 305 and 306, the SCSI Isolators 300 and 301, drive shelf 325 with any attached drives, and repeater 326. These power supplies 330 and 331 are hot-pluggable and are preferably connected to separate power sources, such as separate uninterruptable power supplies. If the optional drive shelf 327 is connected, this shelf has an additional pair of power supplies 332 and 333, that are also preferably connected to separate power sources, such as the uninterruptable power supplies 122 and 123 of FIG. 1. These additional power supplies 332 and 333 also power any drives attached to the optional drive shelf 327.

The computing elements 400 and 401 of the server of the present invention are slideably mounted on rails in the rack-mountable server cabinet 402. Also accessible from the front of server cabinet 402 so that they may be replaced without disassembly of other portions of the server are the six hot-pluggable drives 405 of the RAID system, and the RAID controllers 407. Accessible from the back of the server cabinet 402 so that they may be replaced without disassembly of other portions of the server are the hot pluggable power supplies of the RAID system. The controls for the SCSI isolators and KVM switch are accessible from the server cabinet back, but can not be replaced without shutting down the system. The hot-pluggable drives 412 of each computing element 400 and 401 are accessible from the front of the computing elements, so that they may be changed without need for sliding the associated computing element out of the server cabinet 402 and without need for opening the associated computing element case.

While there have been described above the principles of the present invention with specific embodiments thereof, it is to be understood that the foregoing description is made by way of example and not as limitation to the scope of the invention. The foregoing disclosure may suggest other modifications to those persons skilled in the relevant art. For example, it is possible that the computing elements 100 and 101 could be built each with a pair of Intel Xeon or Intel Pentium-III processors, and it is possible that future models may utilize a 133 MHz front-side bus with RAMBUS main memory in place of the PC-100 SDRAM heretofore described. It is also anticipated that each computing element may be configured with more than the memory described, each computing element of the preferred embodiment is readily reconfigurable with up to a gigabyte of memory should that much memory be needed. Each computing element also has available expansion slots in its PCI bus, these may have almost any available additional PCI card inserted into them without detracting from the invention as claimed. Such modifications may involve other features which are already known per se and which may be used instead of or in addition to features already described herein.

What is claimed is:

1. A fault-tolerant network server comprising:

a first processing unit coupled to receive power through a first power cord, the processing unit comprising at least one CPU, system memory coupled to the at least one CPU, an interface for a RAID system and addressable by the at least one CPU, at least one disk drive addressable by the at least one CPU, a network interface addressable by the at least one CPU, and a case containing said at least one CPU, system memory, interface for a RAID system, network interface, and disk drive;

a second processing unit coupled to receive power through a second power cord, the processing unit comprising a case, at least one CPU disposed within the case, system memory coupled to the at least one CPU and disposed within the case, an interface for a RAID system addressable by the at least one CPU and disposed within the case, a network interface addressable by the at least one CPU and disposed within the case, at least one disk drive addressable by the at least one CPU and disposed within the case, and a power supply disposed within the case, coupled to energize the CPU, system memory, interface for a RAID system, network interface, and disk drive;

a RAID system coupled to receive power both through the first power cord and the second power cord, said RAID system coupled to the first processing unit and to the second processing unit including a shelf for mounting hot-pluggable disk drives, a first RAID controller coupled to said shelf and to the first processing unit and a second RAID controller coupled to said shelf and to the second processing unit, wherein the first RAID controller is coupled to said shelf for mounting hot-pluggable disk drives through a first isolation circuit, and wherein the second RAID controller is coupled to said shelf for mounting hot-pluggable disk drives through a second isolation circuit, and wherein the first and the second isolation circuits each include a manually activated disable switch that, when in a disable setting, causes the isolation circuit to block all transactions between a RAID controller and a processing unit, a connection present detection circuit that, when a processing unit connection cable is detected as being disconnected from the isolation circuit, causes the isolation circuit to block all transactions between the RAID controller and the processing unit connection cable, and an activity monitor that creates a visual indication of transactions between the processing unit and the RAID controller; and a network server case, the case of each of the first and second processing units being slideably mounted within the network server case, and the RAID system being disposed within the network server case.

2. The failure-resistant network server of claim 1, wherein the first processing unit and the second processing unit run software capable of performing a fail-over should either of the first processing unit and the second processing unit fail.

3. A fault-tolerant network comprising:

a first CPU;

a first isolation circuit coupled to the first CPU;

a first RAID controller coupled to the first isolation circuit;

a second RAID controller coupled to the first RAID controller;

a disk drive coupled to the first and second RAID controllers;

a second isolation circuit coupled to the second RAID controller; and a second CPU coupled to the second isolation circuit, wherein the first and second isolation circuits each include a manually activated disable switch.

4. The fault-tolerant network of claim 3 further comprising system memory coupled to the first and second CPUs.

5. The fault-tolerant network of claim 3 in which the first and second RAID controllers each comprise two SCSI ports.

6. The fault-tolerant network of claim 3 in which the first and second isolation circuits each comprise a SCSI isolation circuit.

7. The fault-tolerant network of claim 3 in which the manually activated disable switch comprises a momentary-contact switch.

8. The fault-tolerant network of claim 3 in which the manually activated disable switch comprises a toggle flip-flop.

9. The fault-tolerant network of claim 3 in which the manually activated disable switch further comprises a current setting indicator.

10. The fault-tolerant network of claim 9 in which the current setting indicator comprises a light emitting diode.

11. The fault-tolerant network of claim 3 further comprising a heartbeat interconnection between the first and second RAID controllers.

12. A fault-tolerant network comprising:

at least one processing unit;

at least one isolation circuit;

at least one RAID controller, all in communication with each other; and a RAID shelf including at least one disk drive in communication with the at least one RAID controller, wherein the at least one isolation circuit includes a manually activated disable switch.

13. The fault-tolerant network of claim 12 further comprising system memory coupled to the at least one processing unit.

14. The fault-tolerant network of claim 12 in which the at least one RAID controller comprises two SCSI ports.

15. The fault-tolerant network of claim 12 in which the at least one isolation circuit comprises a SCSI isolation circuit.

16. The fault-tolerant network of claim 12 in which the manually activated disable switch comprises a momentary-contact switch.

17. The fault-tolerant network of claim 12 in which the manually activated disable switch comprises a toggle flip-flop.

18. The fault-tolerant network of claim 12 in which the manually activated disable switch further comprises a current setting indicator.

19. The fault-tolerant network of claim 18 in which the current setting indicator comprises a light emitting diode.

20. The fault-tolerant network of claim 12 further comprising a heartbeat interconnection between a first and a second RAID controller.

* * * * *